United States Patent
Schwall et al.

(10) Patent No.: US 11,676,205 B2
(45) Date of Patent: *Jun. 13, 2023

(54) DYNAMIC PEG ORDERS IN AN ELECTRONIC TRADING SYSTEM

(71) Applicant: IEX GROUP, INC., New York, NY (US)

(72) Inventors: John Herbert Schwall, Staten Island, NY (US); Eric Wayne Stockland, Frankfort, IL (US); Bradley Toshio Katsuyama, Darien, CT (US); Ronan Gerard Ryan, Morristown, NJ (US); Boris Ilyevsky, New York, NY (US); Lucas Tanner Kowalczyk, New York, NY (US); Benjamin Jerome Pierre Connault, New York, NY (US)

(73) Assignee: IEX Group, Inc., New York, NY (US)

(*) Notice: Subject to any disclaimer, the term of this patent is extended or adjusted under 35 U.S.C. 154(b) by 665 days.

This patent is subject to a terminal disclaimer.

(21) Appl. No.: 16/693,788

(22) Filed: Nov. 25, 2019

(65) Prior Publication Data

US 2020/0167866 A1    May 28, 2020

Related U.S. Application Data

(63) Continuation-in-part of application No. 16/170,589, filed on Oct. 25, 2018, now Pat. No. 11,423,479, and a continuation-in-part of application No. 15/368,010, filed on Dec. 2, 2016, now Pat. No. 10,706,470, said application No. 16/170,589 is a continuation of application No. 14/799,975, filed on Jul. 15, 2015, now Pat. No. 10,185,993.

(60) Provisional application No. 62/040,493, filed on Aug. 22, 2014.

(51) Int. Cl.
*G06Q 40/04* (2012.01)

(52) U.S. Cl.
CPC .................................. *G06Q 40/04* (2013.01)

(58) Field of Classification Search
CPC ....................................................... G06Q 40/04
See application file for complete search history.

(56) References Cited

U.S. PATENT DOCUMENTS

| | | | | |
|---|---|---|---|---|
| 8,484,121 B2* | 7/2013 | Balabon | ................ | G06Q 40/00 705/37 |
| 9,774,401 B1* | 9/2017 | Borrill | .................. | H04L 9/0852 |
| 2004/0210511 A1* | 10/2004 | Waelbroeck | .......... | G06Q 40/04 705/37 |
| 2010/0274736 A1* | 10/2010 | Hodjat | ................... | G06Q 40/06 705/36 R |

(Continued)

*Primary Examiner* — Jessica Lemieux
(74) *Attorney, Agent, or Firm* — Goodwin Procter LLP

(57) ABSTRACT

In order to protect a trading party from predatory trading strategies employed by some market participants, especially during certain periods when quotes for a particular security are experiencing rapid changes or transitions, embodiments of the present invention facilitate and support various new type of trading orders whose booking and execution behaviors are dynamically varied in response to environmental market conditions and/or predefined rules. For example, the orders may be allowed to trade at more aggressive price levels if the market is relatively stable, and the orders can only trade at less aggressive price levels or be automatically suspended or even cancelled when the market is unstable.

20 Claims, 7 Drawing Sheets

(56) References Cited

U.S. PATENT DOCUMENTS

2012/0166327 A1\* 6/2012 Amicangioli ....... G06F 11/0709
705/37

\* cited by examiner

FIG. 1A

Example 1A. Buy DPO with Limit Price Same as NBBO Midpoint

| (Unit: cents) | Bid | Midpoint | Offer |
|---|---|---|---|
| NBBO | 10 | 12 | 14 |
| Buy DPO @12 | Booked @10 | | |
| | Recheck up to 12 | | |

FIG. 1B

Example 1B. Sell DPO with Limit Price Same as NBBO Midpoint

| (Unit: cents) | Bid | Midpoint | Offer |
|---|---|---|---|
| NBBO | 10 | 12 | 14 |
| Sell DPO @12 | | | Booked @14 |
| | | | Recheck down to 12 |

FIG. 2

Example 2. DPOs with Limit Less Aggressive than NBBO Midpoint

| (Unit: cents) | Bid | Midpoint | Offer |
|---|---|---|---|
| NBBO | 10 | 12 | 14 |
| Buy DPO @11 | Booked @10 | | |
| | Recheck up to 11 | | |
| Sell DPO @13 | | | Booked @14 |
| | | | Recheck down to 13 |

FIG. 2A

Example 2A. After NBO Drops

| (Unit: cents) | Bid | Midpoint | Offer |
|---|---|---|---|
| NBBO | 10 | 11←12 | 12←14 |
| Buy DPO @11 | Booked @10 | | |
| | Recheck up to 11 | | |
| Sell DPO @13 | | | Booked @13 |
| | | | Recheck to 13 |

FIG. 2B

Example 2B. After NBO Rises

| (Unit: cents) | Bid | Midpoint | Offer |
|---|---|---|---|
| NBBO | 10→12 | 12→13 | 14 |
| Buy DPO @11 | Booked @11 | | |
| | Recheck to 11 | | |
| Sell DPO @13 | | | Booked @14 |
| | | | Recheck to 13 |

FIG. 3

Example 3. DPOs with Limit More Aggressive than NBBO Midpoint

| (Unit: cents) | Bid | Midpoint | Offer |
|---|---|---|---|
| NBBO | 10 | 12 | 14 |
| Buy DPO @13 | Booked @10 | | |
| | Recheck up to 12 | | |
| Sell DPO @11 | | | Booked @14 |
| | | | Recheck down to 12 |

FIG. 4

Example 4. (For Comparison) Midpoint Peg Orders (MPOs)

| (Unit: cents) | Bid | Midpoint | Offer |
|---|---|---|---|
| NBBO | 10 | 12 | 14 |
| Buy MPO @13 | | Booked @12 | |
| A Sell Order comes in @13 | | | Booked @12 (Executed w/ MPO @12) |
| Sell MPO @10 | | Booked @12 | |
| A Buy Order comes in @12 | (Executed w/ MPO @12) | | |

FIG. 5A

Example 5A. No Restriction during Quote Instability

| (Unit: cents) | Bid | Midpoint | Offer |
|---|---|---|---|
| Markets 1/2/3 | 10 | 12→12.5 | 14→15 |
| Markets 4/5 | 10 | 12 | 14 |
| Non-DPOs | Buy orders @12 could be executed by Markets 4/5 @12 | | |

FIG. 5B

Example 5B. Restriction on DPO Execution during Quote Transition

| (Unit: cents) | Bid | Midpoint | Offer |
|---|---|---|---|
| Markets 1/2/3 | 10 | 12→12.5 | 14→15 |
| Markets 4/5 | 10 | 12 | 14 |
| DPOs | DPOs can only be executed at NBB/NBO during quote transition | | |

DYNAMIC PEG ORDERS IN AN ELECTRONIC TRADING SYSTEM

CROSS-REFERENCE TO RELATED APPLICATIONS

The present application is a continuation-in-part of U.S. Utility application Ser. No. 16/170,589, titled "DYNAMIC PEG ORDERS IN AN ELECTRONIC TRADING SYSTEM," filed Oct. 25, 2018, which is a continuation of U.S. Utility application Ser. No. 14/799,975 (now U.S. Pat. No. 10,185,993), also titled "DYNAMIC PEG ORDERS IN AN ELECTRONIC TRADING SYSTEM," filed Jul. 15, 2015, which claims the benefits and priority of U.S. Provisional Application No. 62/040,493, filed Aug. 22, 2014.

The present application is also a continuation-in-part of U.S. Utility application Ser. No. 15/368,010, titled "SYSTEMS AND METHODS FOR PROCESSING FULL OR PARTIALLY DISPLAYED DYNAMIC PEG ORDERS IN AN ELECTRONIC TRADING SYSTEM," filed Dec. 2, 2016.

The present application is further related to PCT International Application No. PCT/US13/59558, filed Sep. 12, 2013, titled "TRANSMISSION LATENCY LEVELING APPARATUSES, METHODS AND SYSTEMS," which in turn claimed priority to U.S. Provisional Application Nos. 61/700,094 (filed Sep. 12, 2012), 61/753,857 (filed Jan. 17, 2013), 61/758,508 (filed Jan. 30, 2013), and 61/876,200 (filed Sep. 11, 2013).

All of the above-referenced patent applications are incorporated herein by reference in their entireties.

FIELD OF THE INVENTION

The present invention disclosed herein relates generally to apparatuses, methods, and systems for electronic trading and/or auction. More particularly, the present invention relates to apparatuses, methods and systems for order book management and trade execution with respect to dynamic peg orders and other electronic trading techniques.

BACKGROUND OF THE INVENTION

In the prior, related applications, such as PCT International Application No. PCT/US13/59558, Applicant disclosed various innovations related to electronic trading and computer-implemented platforms/infrastructure to facilitate improvements in electronic trading. One goal of such innovations is to reduce or deter predatory trading behavior so as to maintain a fair marketplace for all participants big or small. In particular, it is one object of those innovations and the present invention to minimize or eliminate information leakage and the use of the same in unfair trading strategies such as order book arbitrage or latency arbitrage.

For example, as previously explained, in the U.S. there is no such thing as a single national security exchange in a single location—instead, a number of security exchanges exist and operate at different locations. Since numerous trades are executed at some or all of these exchanges at any given moment and it takes time for market data updates to propagate among the exchanges, the order books of all the exchanges cannot be perfectly synchronized and updated at all times. High-speed traders can take advantage of quote instabilities, when momentary discrepancies exist among order books of different exchanges for the same security, to conduct trades at stale price points and therefore reap benefits to the disadvantage of other market participants. Furthermore, these momentary discrepancies can be anticipated before they actually occur by, for example, receiving and processing real-time low-latency market data feeds that permit a high-speed market participant to understand developing conditions that typically precede, or are characteristic, of quote instability.

For another example, the conventional approaches by which order books are managed could also lead to information leakage. High-speed traders can use a number of tactics such as small orders or non-firm orders (e.g., "indications of interest," "discretionary orders," "negotiable orders," "non-firm quotations," or "immediate-or-cancel orders") to probe the order books of the exchanges. Once a trade confirmation or other feedback from an exchange indicates the existence of a large, hidden or non-displayed order, the high-speed traders could place additional trades to take advantage of such order.

Other problems may also exist with existing electronic trading systems.

SUMMARY OF THE INVENTION

Embodiments of the present invention aim to reduce or eliminate the above-described problems in electronic trading systems.

In order to protect a trading party from predatory trading strategies employed by some market participants, especially during certain periods when quotes for a particular security are experiencing rapid changes or transitions, embodiments of the present invention facilitate and support a new type of trading orders whose booking and execution behaviors are dynamically varied in response to environmental market conditions. Pursuant to predefined rules for the new type of trading orders, the orders may be allowed to trade at more aggressive price levels if the market is relatively stable, and the orders can only trade at less aggressive price levels when the market is unstable.

Dedicated hardware and/or software components of an electronic trading platform may screen incoming orders to identify those that qualify for exercising price discretion. Environmental market conditions, such as price movements at other trading venues, are monitored and used as a basis for varying or limiting price discretion for the qualified orders during booking and/or execution.

BRIEF DESCRIPTION OF THE DRAWINGS

Various embodiments of the present invention taught herein are illustrated by way of example, and not by way of limitation, in the figures of the accompanying drawings, in which:

FIGS. 1A, 1B, 2, 2A, 2B, 3, 4, 5A, and 5B show hypothetical examples 1A, 1B, 2, 2A, 2B, 3, 4, 5A, and 5B, respectively, illustrating an exemplary order entry and recheck methodology for dynamic peg orders according to embodiments of the present invention;

DETAILED DESCRIPTION OF THE INVENTION

Figure 6:
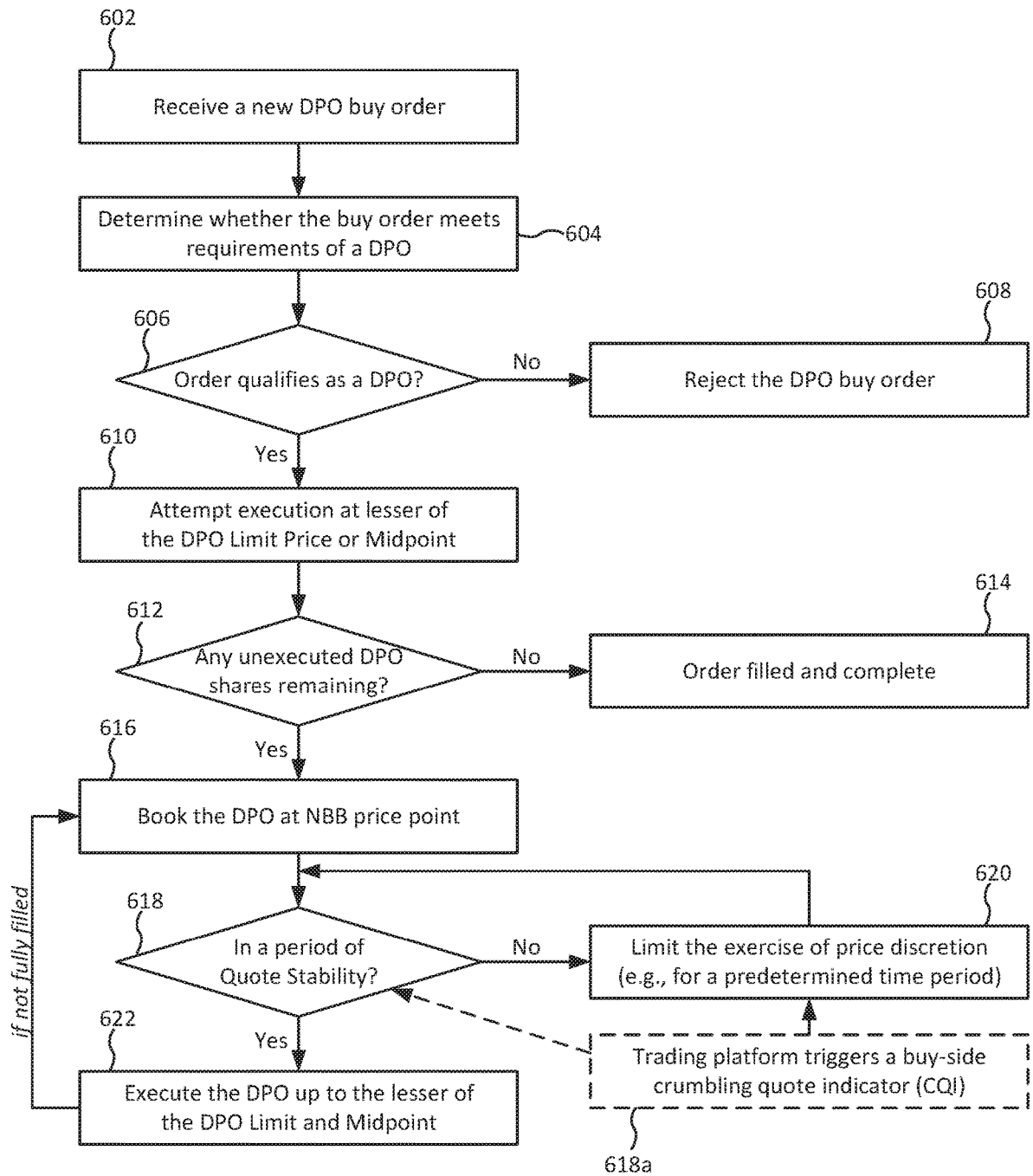
FIG. 6 is a flowchart illustrating an exemplary process and algorithm for processing a DPO buy order according to an embodiment of the present invention.

To further improve the fairness and efficiency of an electronic trading system (such as the TLL/POP facilitated trading platform previously disclosed in PCT International Application No. PCT/US13/59558), embodiments of the present invention introduce a new type of trading orders known as "dynamic peg orders" or "discretionary peg orders" (or DPOs) and related order entry and execution mechanisms. Dynamic peg orders are designed to change their processing and matching behavior in response to environmental market conditions. During certain environmental market conditions (e.g., during a period of quote stability), a DPO may be willing to trade at a more aggressive price; during other environmental market conditions (e.g., during a period of quote instability), the DPO may be willing to trade at a less aggressive price. The dynamically pegged (or booked) price points for a DPO may help protect the party who submitted the order from predatory trading strategies employed by some market participants.

According to some embodiments of the present invention, "dynamic peg orders" (or DPOs) may be limit orders, or unpriced orders, priced automatically as determined by the electronic trading system to be equal to the primary quote (or mid, or market, or other predetermined price point) of the "national best bid and offer price" or NBBO (i.e., "national best bid" or NBB for buy orders, "national best offer" or NBO for sell orders), up (for a bid) or down (for an offer) to the order's limit price (or another predetermined price point). According to certain implementations, a dynamic peg order will execute up/down to the midpoint (or another predetermined price point) against a contra-side order priced at the midpoint (or such other predetermined price point) or better, during a period of "quote stability" as determined by the electronic trading system. More generally, the electronic trading system may impose different booking or execution restrictions on a DPO, for example, by allowing it to execute in a first price range when quotes are unstable and allowing it to execute in a second, more aggressive price range when quotes are stable. According to other embodiments, rather than labeling it as a new order type, the order book entries and trade executions of an exchange may be simply implemented by an electronic trading system based on the above DPO methodology.

The IEX electronic trading system is an exemplary trading system in which the DPOs and related operations may be implemented according to one embodiment of the present invention.

Quote Stability

One example of "environmental market conditions" is a period of "quote stability" which refers to a time period when quotes are stable as the quotations for a symbol or security across many venues are holding steady and not changing. Such a period of "quote stability" may be defined in a number of ways. The restriction related to "quote stability"—that is, requiring either order to be one entered and/or marketable (i.e., priced at an immediately executable price) during a period of "quote stability"—increases the chance that DPOs are executed against contra-side orders at more aggressive prices only during situations when the market is stable, or at less aggressive prices when the quote is not stable, thereby reducing the chance of predatory trading strategies taking advantage of price dislocations during quote instability among the exchanges.

According to one embodiment of the present invention, a period when a quote is "unstable" may be defined as one where:

$$(\text{\# of near side venues}) - 2 \times (\text{\# of far side venues}) > 4$$

Here, for a particular security (e.g., Microsoft common stock MSFT), the "# of near side venues" refers to the total number of markets or trading venues (e.g., the 11 stock exchanges) each of which publishes a quotation on the near side of the DPO in question; "# of far side venues" refers to the total number of markets or venues each of which publishes a quotation on the far side of the DPO in question. The terms "near side" and "far side" are relative to the DPO in question where a far side quotation is on the contra-side of the DPO while the near side quotation is on the same side of the DPO. For example, for a buy DPO, another bid is on its near side at the NBB while an offer is on its far side at the NBO; for a sell DPO, another offer is on its near side at the NBO while a bid is on its far side at the NBB. The pronounced difference between the number of near side and far side quotations is an indication of quote volatility and/or a quote transition underway.

According to another embodiment of the present invention, a period when a quote is "unstable toward the bid" may be defined as one where $$(\text{\# of NBO venues}) - 2 \ast (\text{\# of NBB venues}) > 4$$

Here, the "# of NBO venues" refers to the total number of markets or venues each of which publishes the NBO quotation for the subject of the DPO in question; the "# of NBB venues" refer to the total number of markets or venues each of which publishes the NBB quotation for the subject of the DPO in question. It is noted that, while there are currently 12 NBBO venues, any number of them from 1 to all 12 could have a quote at the NBBO, that is, at least one quoting at the NBB and at least one quoting at the NBO (but not necessarily the same venue quoting at both NBB and NBO simultaneously). According to an implementation of the present invention, a DPO might trade less aggressively when the quote is leaning in one specific direction (i.e. unstable while leaning in the direction of the order), or it might trade differently when the quote is unstable in either direction.

It should be noted that the above formulae are exemplary methods of defining a period of "quote instability" given the current number of quoting exchanges or venues. Other methods or criteria of determining or detecting a period of "quote instability" (or conversely, a period of "quote stability") may also be used.

In one embodiment of the present invention, a dynamic peg order is considered "active" when it has just arrived at the exchange or during an order book recheck (such as the recheck process implemented by IEX's trading system). In both instances the DPO is active when it is testing against contra-side orders resting in the order book. In one embodiment of the present invention once the DPO is booked, it is considered "resting" and may be eligible to execute with newly arrived or active contra-side orders or orders that are testing against or being rechecked against the order book.

Active Dynamic Peg Behavior

During order entry of an active DPO, the electronic trading system may test DPO against the order book (and execute the order) up to the order's limit or the midpoint, whichever is less aggressive. If any shares remain, then the DPO may be booked at the primary quote of the corresponding NBB (for a buy DPO) or NBO (for a sell DPO).

During an order book recheck, the DPO may be invited to execute up to the midpoint or the DPO limit price (whichever is less aggressive) assuming it is not a period of "quote instability."

Resting Dynamic Peg Behavior

According to embodiments of the present invention, a resting DPO can rest on the primary quote of NBB (for buy DPO) or NBO (for sell DPO) up to the order's limit. Resting DPOs may execute with active Limit, Market, Midpoint Pegged/Constrained orders and DPOs down/up to the active buy/sell order's limit, assuming it is not a period of "quote instability."

The hypothetical examples shown in FIGS. 1-5 illustrate the order entry and recheck methodology for DPOs. In each of the tables shown in FIGS. 1-4, the first row under the header row shows the national best bid/offer as well as midpoint prices for a hypothetical stock.

In Example 1A (shown in FIG. 1A), the NBB and NBO are 10 and 14 cents per share respectively, and therefore the NBBO midpoint is 12 cents per share. A DPO to buy shares at a limit price of 12 cents per share (same as NBBO midpoint) will be booked at NBB (i.e., 10 cents per share), but this buy DPO will be willing to recheck up to its limit price of 12 cents per share.

According to an alternative embodiment of the present invention, how the DPO is booked may depend on the environmental market conditions. For example, during a period of "quote stability," the DPO to buy shares at a limit price of 12 cents per share may be booked at the NBBO midpoint of 12 cents per share; during a period of "quote instability," this buy DPO may "back off" to the NBB of 10 cents per share.

Similarly, with the same NBBO price points, a DPO to sell shares at a limit price of 12 cents per share (same as NBBO midpoint) will be booked at NBO (i.e., 14 cents per share), but this sell DPO will be willing to recheck down to its limit price of 12 cents per share. This is illustrated in Example 1B (shown in FIG. 1B). According to an alternative embodiment, during a period of "quote stability," the DPO to sell shares at a limit price of 12 cents per share may be booked at the NBBO midpoint of 12 cents per share; during a period of "quote instability," this sell DPO may "back off" to the NBO of 12 cents per share.

In Example 2 (shown in FIG. 2), the NBB and NBO are again 10 and 14 cents per share respectively, and therefore the NBBO midpoint is 12 cents per share. A DPO to buy shares at a limit price of 11 cents per share (less aggressive than NBBO midpoint) will be booked at NBB (i.e., 10 cents per share), but this buy DPO will be willing to recheck up to its limit price of 11 cents per share. Similarly, a DPO to sell shares at a limit price of 13 cents per share (also less aggressive than NBBO midpoint) will be booked at NBO (i.e., 14 cents per share), but this sell DPO will be willing to recheck down to its limit price of 13 cents per share.

If, as shown in Example 2A (FIG. 2A), the NBO subsequently drops from 14 to 12 cents per share, causing the NBBO midpoint to drop from 12 to 11 cents per share, then the sell DPO (at 13 cents) should be booked at its limit price of 13 cents per share and willing to recheck to the same price point because it has now become less aggressive than the NBO. The book entry and rechecking for the buy DPO (at 11 cents) remain the same. The buy DPO book entry (at 10 cents per share) remains the same but will now be willing to recheck up to 11 cents.

If, as shown in Example 2B (FIG. 2A), the NBB rises from 10 to 12 cents per share, causing the NBBO midpoint to rises from 12 to 13 cents per share, then the buy DPO (at 11 cents) should be booked at its limit price of 11 cents per share and willing to recheck to the same price point because it has now become less aggressive than the NBB. The sell DPO book entry (at 14 cents per share) remains the same but will now be willing to recheck down to 13 cents.

In Example 3 (FIG. 3), the NBB and NBO are again 10 and 14 cents per share respectively, and therefore the NBBO midpoint is 12 cents per share. A DPO to buy shares at a limit price of 13 cents per share (more aggressive than NBBO midpoint) will be booked at NBB (i.e., 10 cents per share), but this buy DPO will be permitted to recheck up to the NBBO midpoint of 12 cents per share. Similarly, a DPO to sell shares at a limit price of 11 cents per share (also more aggressive than NBBO midpoint) will be booked at NBO (i.e., 14 cents per share), but this sell DPO will be permitted to recheck down to the NBBO midpoint of 12 cents per share.

For comparison purpose, exemplary behavior of midpoint peg orders (MPOs) are shown in Example 4 (FIG. 4) while the NBB and NBO are 10 and 14 cents per share respectively and therefore the NBBO midpoint is 12 cents per share. MPOs are booked, and executable at, the NBBO midpoint regardless of quote stability/instability.

Examples 5A and 5B (shown in FIGS. 5A-5B) illustrate another benefit of the DPO methodology described above, namely the DPO rule which seeks to prevent execution at more aggressive prices with orders entered or that became marketable during a period of "quote instability." As shown in Example 5A (FIG. 5A), a hypothetical security is traded on Markets 1-5 which all started with the NBB and NBO at 10 and 14 cents per share respectively (therefore the NBBO midpoint is at 12 cents per share). If some of the markets (Markets 1-3) experience a change in the NBO from 14 to 15 cents per share (commencing a period of quote instability), the NBBO midpoint is anticipated to rise from 12 to 12.5 cents per share. Before the quotes on other markets (Markets 4 and 5) transition, predatory strategies could race to those markets and successfully execute orders at the potentially soon to be outdated midpoint of 12 cents per share. In contrast, the quote instability period could be detected by the electronic trading system according to embodiments of the present invention which could halt the execution of DPOs against orders at potentially soon to be outdated midpoints (i.e. more aggressive prices) entered during the quote transition period, thereby defeating a predatory strategy's attempt at order book arbitrage. However, DPOs may still be permitted to execute at less aggressive prices, for example at the NBB or NBO during the period of quote instability.

Computer-Implementation

The components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in an electronic trading system may be configured with a special set of program instructions to recognize a dynamic peg order (DPO) and automatically perform the order entry, order book recheck, and trade execution functions consistent with the methodology described above.

Figure 8:
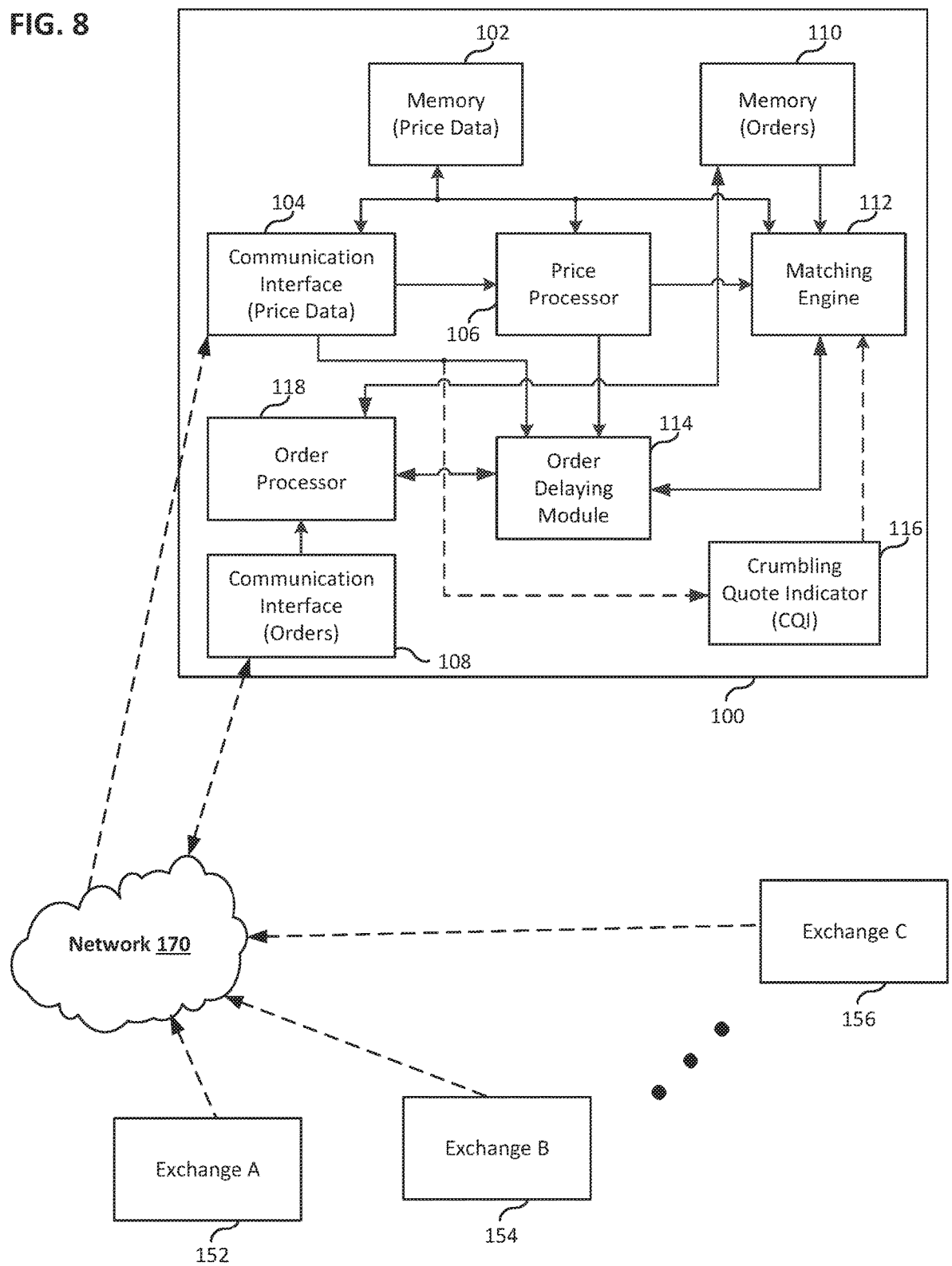
FIG. 8 schematically depicts an electronic trading platform implementing dynamic peg orders according to one embodiment, and a typical operating environment of such a platform.

More specifically, FIG. 8 shows a block diagram of an exemplary electronic trading platform 100 implementing dynamic peg orders according to one embodiment and a typical operating environment of such a platform.

The platform 100 allows various market participants to perform transactions relating to one or more items of interest. In some embodiments, the item of interest may be a security (e.g., a stock or a bond). In other embodiments, the item of interest may be an event ticket, a ticket for a service, and/or an article for sale. While the description below generally considers a security as the item of interest, this is only for the sake of convenience. The techniques described herein are applicable to various different types of items of interest identified above.

Typically for a security, at a particular instant of time the platform 100 has a price associated with that security. That price may be stored in a memory module 102. Events, such as trading events associated with the security, can occur at one or more venues such as Exchange A (152), Exchange B (154), and Exchange C (156), which can be trading exchanges, electronic communication networks (ECNs) registered as broker-dealers, alternative trading systems (ATSs) approved by a regulatory agency such as the U.S. Securities and Exchange Commission, private exchanges or forums for trading securities, generally known as dark pools, and/or alternative display facilities (ADF). The number of venues can be any number, e.g., 1, 2, 5, 6, 11, 15, etc. One or more of the events can affect the price of the security. Therefore, the platform 100 may receive data updates about such events from the one or more sources 162, 164, 166 through a network 170 (e.g., the Internet, a proprietary network, etc.), so that the platform can update the price of the security using the received event data. Data from different sources/venues may be received through different networks and/or networks of different types. Typically, the events continue to occur as time progresses and, hence, the event data may be received by the platform 100, via a communication interface 104, on an on-going basis.

After price data for a security (an item of interest, in general) is received from a source, that data is typically used to update a price of the security, such as in an order book maintained by the platform 100. To this end, the communication interface may store the price data in the memory module 102 and/or may forward that data to a price processor 106. In some embodiments, the price processor 106 can access the received data from the memory module 102. In various embodiments, the price processor computes an updated price for the security using the received price data, and may store the updated price in the memory module 102.

In different embodiments, the price processors 106 may have different architectures. For example, the price processor 106 may include a single processor or may include several processors performing price-updating computations in sequence and/or in parallel. One or more processors can be general purpose processors and/or specialized processors such as math co-processors. In some embodiments, one or more processors may include application specific integrated circuits (ASICs) and/or field programmable gate arrays (FPGAs). The price processor 106 may be implemented using hardware processors only, using hardware processors having embedded software, or using processors executing software instructions accessed from memory.

The platform 100 may also include a communication interface 108 for trading orders or transaction requests in general to be received from and/or routed to market participants and/or other venues. An order processor 118 may process the incoming trading orders or transaction requests, for example, by screening and sorting them into different order types. For instance, the order processor 118 may examine new orders to determine whether their content and format meet certain requirements and whether they qualify as dynamic peg orders or other types. With or without being processed by the order processor 118, the trading orders or transaction requests may be stored in a memory module 110.

In general, a matching engine 112, implemented using one or more processors and/or software, matches a transaction request received from one participant with one or more transaction requests that were previously received from one or more other participants. Such previously received transaction requests may be called orders resting on the order book or resting orders, and may be stored in the memory module 110. An order resting on the order book may rely on the platform 100 to provide the up-to-date price of a security and, as such, if an order based on the most up-to-date price is received from a high-speed trader before the platform has computed the most up-to-date price, the matching engine 112 may match the order using stale price information, giving the high-speed trader an undue advantage.

To prevent matching a transaction request based on the latest security-related information with a transaction request based on a stale price of the security, or to minimize the risk of permitting such an unfair match, the platform 100 may employ an order delaying module 114 that delays the transaction requests received by the communication interface 108 before they are forwarded to the matching engine 112 for matching (or simply delay the processing of the requests by the matching engine). The forwarding delay may be introduced using a buffer implemented in hardware and/or software. The introduced forwarding delay may be related to the communication delay and the processing delay that is determined or obtained by the platform 100.

By introducing this forwarding delay and/or additional processing delay, the platform 100 can ensure, or at least increase the likelihood, that the price processor 106 has determined the true, up-to-date price of a security based on the latest information/data about the security, so that the matching engine 112 has knowledge of the up-to-date price when it attempts to match transaction requests. By delaying the requests, the platform 100 can make the up-to-date price of securities (items of interest, in general) available to all participants prior to matching their transaction requests, thereby reducing the likelihood that certain participant(s) can take an undue advantage of other participants.

Furthermore, to implement dynamic peg orders in accordance with embodiments described herein, a crumbling quote indicator module 116 may receive price data from other exchanges via the communication interface 104 and determine, based on the price data and a predetermined algorithm, whether a security is experiencing a period of quote instability. The result of the determination, such as a CQI signal, may be fed from the crumbling quote indicator module 116 to the matching engine 112 to vary the execution and order-book rechecking behaviour of DPOs.

Exemplary Rules Governing Dynamic Peg Orders

According to a particular embodiment of the present invention, a dynamic peg order or discretionary peg order may be defined and regulated in an electronic trading system with a detailed set of rules. For example, it may be specified that, upon entry, a DPO for a particular symbol or security is priced automatically by the trading system to be equal to the less aggressive price point of a Midpoint Price or the DPO's Limit Price (if any). Any unexecuted shares of such order are posted to the Order Book, priced to be equal to the primary quote or the order's Limit Price, and is automatically adjusted by the trading system in response to changes in the NBB (NBO) for buy (sell) orders up (down) to the order's Limit Price (if any). In order to meet the Limit Price of Active Orders on the Order Book, a DPO is allowed to exercise the least amount of price discretion necessary from the DPO's resting price on the NBBO to the less aggressive of the Midpoint Price or the DPO's Limit Price. While exercising price discretion, DPOs may be assigned a new timestamp at the discretionary price such that the time priority of the DPOs at the discretionary price can be determined with respect to other orders at that price point. After exercising price discretion, the DPOs may maintain their priority at their resting price.

More specific requirements for a DPO may include:
(A) Must be a Pegged Order.
(B) Must have a "Time In Force" (TIF) of "Market Hours Day" (DAY), "Good Till Time" (GTT), "Good Till Crossing" (GTX), System Hours (SYS) inclusive of pre-, post-, and primary session trading, "Fill or Kill" (FOK) or "Immediate or Cancel" (IOC), as described in Rule 11.190(c) of IEX Group's "Investors' Exchange Rule Book" available on the website of U.S. Securities and Exchange Commission (SEC).
(C) Must be IEX Only.
(D) May not be an Inter-market Sweep Order.
(E) May be submitted with a Limit Price or as an unpriced order.
(F) Are eligible to trade only during the Regular Market Session. As provided in Rule 11.190(a)(3)(D) of IEX Group's "Investors' Exchange Rule Book," any Pegged Order, which is marked DAY, submitted to the trading system before the opening of Regular Market Session will be queued by the trading system until the start of Regular Market Session; any Pegged Order, which is marked with a TIF other than DAY will be rejected when submitted to the trading system during the Pre-Market Session. Any Pegged Order submitted into the trading system after the closing of Regular Market Session will be rejected.
(G) May be a Minimum Quantity Order.
(H) May be an odd lot, round lot, or mixed lot.
(I) Eligible to be invited by the trading system to Recheck the Order Book to trade against interest resting at the Midpoint Price as described in Rule 11.230(a)(1) of IEX Group's "Investors' Exchange Rule Book."
(J) Eligible to exercise price discretion up to the discretionary price, except during periods of quote instability, as specified in paragraph (K) below.
(K) Quote stability is a measure of whether the exchange or market center believes the NBB (NBO) for a particular security is in the process of changing as indicated by its assessment of relative quoting activity of Protected Quotations at the current NBBO over a period of time.
  (i) Quote instability may be determined by the trading system based on the following factors:
    (a) The NBB and NBO are the same as the NBB and NBO one (1) millisecond ago; and
    (b) The NBBO spread must be less than or equal to the thirty (30) day median NBBO spread during the Regular Market Session; and
    (c) There are more Protected Quotations on the far side; i.e. more quotes on the NBO than the NBB for buy orders, or more quotes on the NBB than the NBO for sell orders; and
    (d) The quote instability factor is greater than the quote instability threshold, as defined below.
    (e) Quote Instability Coefficients. The exchange or market center utilizes the Quote Instability Coefficients below:
      $C_0 = -2.39515$
      $C_1 = -0.76504$
      $C_2 = 0.07599$
      $C_3 = 0.38374$
      $C_4 = 0.14466$
    (f) Quote Instability Variables. The exchange or market center utilizes the Quote Instability Variables defined below to calculate the current quote instability factor.
      N. Number of Protected Quotations on the near side of the market, i.e. NBB for buy orders and NBO for sell orders.
      F. Number of Protected Quotations on the far side of the market, i.e. NBO for buy orders and NBB for sell orders.
      $N_{-1}$. Number of Protected Quotations on the near side of the market one (1) millisecond ago.
      $F_{-1}$. Number of Protected Quotations on the far side of the market one (1) millisecond ago.
    (g) Quote Instability Threshold. The exchange or market center utilizes a Quote Instability Threshold of 0.32.
    (h) Quote Instability Factor. A proprietary method for calculating quote instability as defined by the following formula:

$$\frac{1}{1+e^{-(C_0+C_1 N+C_2 F+C_3 N_{-1}+C_4 F_{-1})}}$$

(ii) If the trading system determines the NBB for a particular security to be unstable in accordance with foregoing paragraph (i), it will trigger a crumbling quote indicator ("CQI") that restricts Buy DPOs in that security from exercising price discretion to trade against interest above the NBB up to and including the Midpoint Price. If the trading system determines the NBO for a particular security to be unstable in accordance with foregoing paragraph (i), it will trigger a CQI that restricts Sell DPOs in that security from exercising price discretion to trade against interest below the NBO down to and including the Midpoint Price.

(iii) CQI will remain in effect at that price level for ten (10) milliseconds.

(iv) The trading system will only trigger a CQI on one side of the market at a time in a particular security.

(v) The exchange or market center may modify the Quote Instability Coefficients and Quote Instability Threshold from time to time.

Exemplary Processes/Algorithms for DPO Buy/Sell Orders

Referring to FIG. 6, there is shown a flowchart illustrating an exemplary process and algorithm for processing a DPO buy order according to an embodiment of the present invention.

In Step 602, a new DPO buy order may be received by an electronic trading platform such as the one illustrated in FIG. 8. The new order may be a request to buy a certain amount of a specified security (e.g., common stock) typically at a specified price point (i.e., Limit Price). For example, the order may be a request to buy 500 shares of Intel Corporation's common stock (ticker INTC) at a Limit Price of $29 per share. The new order may further specify an order type of "DPO" ("dynamic peg order" or "discretionary peg order") or simply requests price discretion based on environmental market conditions.

In Step 604, the electronic trading platform (or its order processor or the like) may determine whether the buy order meets the requirements of a DPO. For example, the platform may parse the order parameters and automatically perform a compliance check against preset DPO rules. If it is decided in Step 606 that the buy order does not qualify as a DPO, then the DPO buy order may be rejected by the platform in Step 608.

If the buy order qualifies as a DPO, then the platform may attempt to execute the DPO buy order in Step 610 against corresponding sell orders available on the order book. The matching engine may try to execute the buy order, for as many shares as possible, at a price point that is the lesser of the DPO Limit Price or the current Midpoint Price. If, after this initial execution (Step 610), there are no unexecuted DPO shares remaining in Step 612, then the DPO buy order is recorded as filled and complete in Step 614. Any remaining, unexecuted DPO shares may be booked in Step 616 at the NBB price point.

In Step 618, it may be determined whether the security of interest is in a period of quote stability. This may be achieved by the trading platform monitoring the price movements of the security on the order books of a number of venues or exchanges and triggering a buy-side crumbling quote indicator (CQI) in Step 618a when the price data of that security meet predefined conditions.

If the security price is experiencing instability among the venues or exchanges (i.e., not in a period of quote stability), then the exercise of price discretion by the booked DPO buy order may be limited in Step 620. For example, a buy-side CQI indicating instabilities may remain in force for a predetermined period of time (e.g., a few milliseconds), causing the restriction of price discretion to continue for the same period of time.

When it is confirmed that the security price is in a period of quote stability (e.g., in the absence of a triggered buy-side CQI), the DPO buy order may be executed in Step 622 up to the lesser of the DPO Limit Price or Midpoint Price. As a result, the buy DPO order is allowed two modes of price discretion: in a first mode, the price discretion is limited since the quotes are unstable or unsteady; in a second mode, the price discretion is less restricted since the quotes are more stable.

Figure 7:
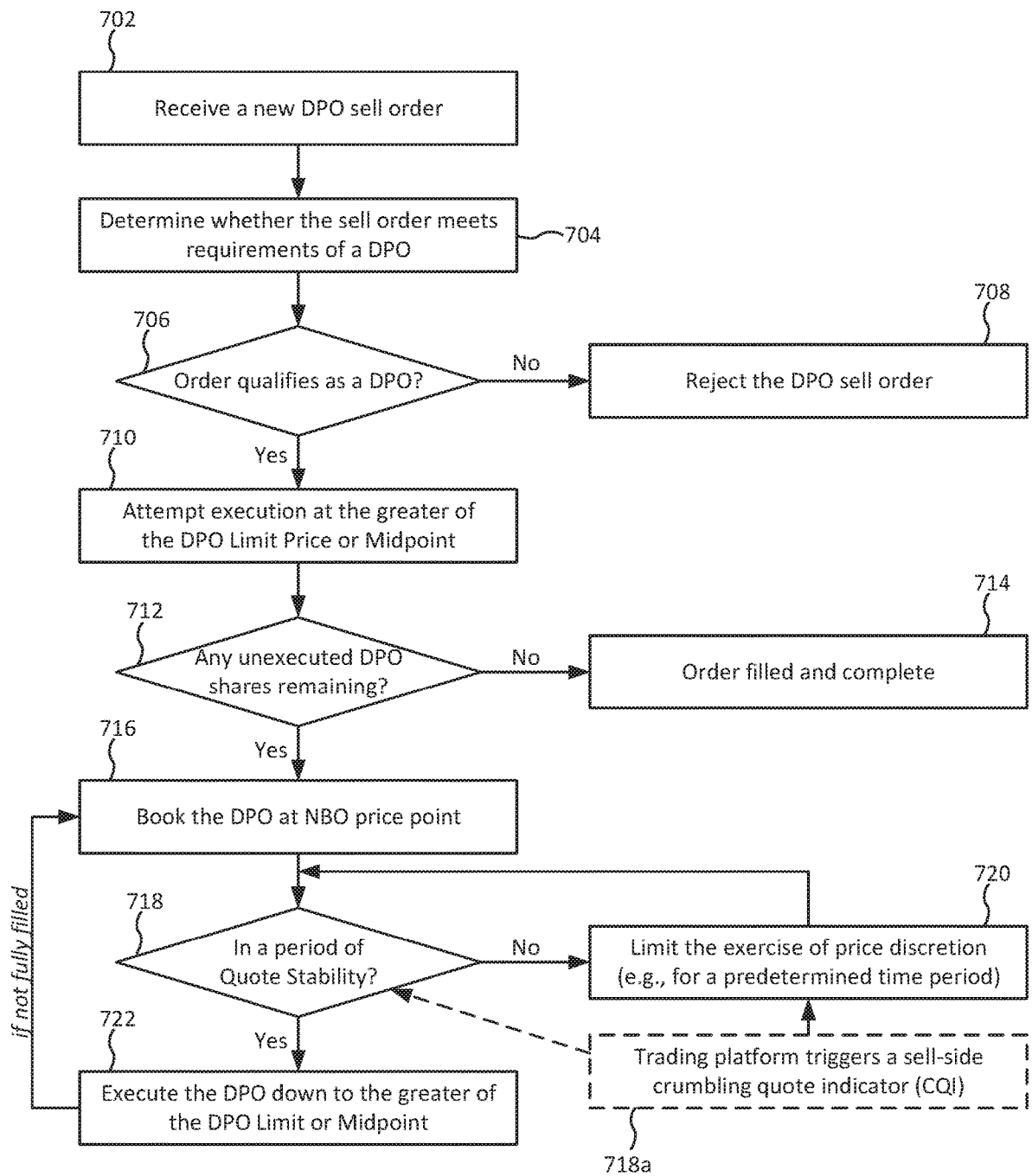
FIG. 7 is a flowchart illustrating an exemplary process and algorithm for processing a DPO sell order according to an embodiment of the present invention.

FIG. 7 is a flowchart illustrating an exemplary process and algorithm for processing a DPO sell order according to an embodiment of the present invention. The process/algorithm shown in FIG. 7 is similar to the one shown in FIG. 6, except that the parameter ranges are modified for the sell order in Steps 710 and 722.

Corporate Discretionary Peg Orders (C-Peg)

SEC Rule 10b-18 establishes a safe harbor for companies and their affiliated purchasers when they repurchase shares of common stock. So long as a company meets the conditions set forth in Rule 10b-18 during a stock repurchase, the SEC will not deem the company or purchasers in violation of anti-fraud provisions of Securities Exchange Act of 1934. The four main conditions under the Rule 10b-18 safe harbor rule are as follows: (1) The Manner of Purchase: The issuer or affiliate must purchase all shares from a single broker or deal during a single day; (2) Timing: An issuer with an average daily trading volume (ADTV) less than $1 million per day or a public float value below $150 million cannot trade within the last 30 minutes of trading, while companies with higher average trading volume or public float value can trade until the last 10 minutes; (3) Price: The issuer must repurchase at a price that does not exceed the highest independent bid or the last transaction price quoted; (4) Volume: The issuer cannot purchase over 25% of the average daily volume.

Although the Rule 10b-18 safe harbor conditions apply directly to issuers (and their affiliated purchasers), issuers typically retain broker-dealers to conduct buybacks on their behalf subject to the relevant conditions of Rule 10b-18. To ensure compliance with some of these conditions under the safe harbor rule, a new type of DPO, known as "Corporate Discretionary Peg Orders" or "C-Peg," may be implemented according to alternative embodiments of the present invention.

According to a preferred embodiment of the present invention, a C-Peg order for a particular symbol or security may be priced automatically by the trading system to be equal to the less aggressive of: (a) the Midpoint Price, (b) the last transaction price reported in the trading system (i.e., the "consolidated last sale price"), or (c) the order's limit price, if any.

The broker-dealer handling issuer repurchase orders with a C-Peg order would be responsible for managing compliance with whether the transaction meets the independence test. A C-Peg order may not peg to the highest independent bid, even if higher than the consolidated last sale price. With respect to the first aspect of the timing conditions, a C-Peg order may not execute until after the first trade in the stock during the day. According to some embodiments, the C-Peg order may or may not assist the broker-dealer to comply with the other conditions under the Rule 10b-18 safe harbor.

According to a particular embodiment of the present invention, a C-Peg order may be a non-displayed, pegged, buy order that, upon entry into the electronic trading system, the price of the order is automatically adjusted to be equal to the less aggressive of the Midpoint Price, the consolidated last sale price, or the order's limit price, if any. Furthermore, when unexecuted shares of a C-Peg order are posted to the order book, the price of the order may automatically adjusted by the trading system to be equal to and ranked at the less aggressive of one minimum price variant ("MPV") than the NBB, the consolidated last sale price, or the order's limit price, if any (the order's "resting price").

In order to meet the limit price of active orders on the order book, a C-Peg order may exercise the least amount of price discretion necessary from the C-Peg order's resting price to its discretionary price (i.e., the less aggressive of the Midpoint Price, consolidated last sale price, or the C-Peg order's limit price, if any), except during periods of quote instability, when a C-Peg order is only eligible to trade at its resting price, as discussed further below. When exercising price discretion, a C-Peg order may maintain time priority at its resting price and is prioritized behind any non-displayed interest at the discretionary price for the duration of that book processing action. If multiple C-Peg orders are exercising price discretion during the same book processing action, they may maintain their relative time priority at the discretionary price. In the event the NBB becomes locked or crossed, C-Peg orders resting on or posting to the order book may be priced one (1) MPV less aggressive than the locking or crossing price.

The trading system may utilize real-time relative quoting activity of certain protected quotations and a proprietary mathematical calculation (the "quote instability calculation") to assess the probability of an imminent change to the current Protected NBB to a lower price ("quote instability factor"). When the quoting activity meets predefined criteria and the quote instability factor calculated is greater than a predefined quote instability threshold, the trading system may treat the quote as unstable and the crumbling quote indicator ("CQI") is on at that price level for two milliseconds, or until the CQI triggers again. During all other times, the quote is considered stable, and the CQI is off. The trading system can independently assess the stability of the Protected NBB and Protected NBO for each security.

According to one embodiment, when the CQI is on, resting C-Peg orders may not exercise price discretion to meet the limit price of an active order. However, C-Peg orders are eligible for execution at their resting price (i.e., one MPV below the NBB) when the CQI is on, if at or below the consolidated last sale price and the order's limit price (if any). Therefore, when the quote is determined to be unstable, C-Peg orders are protected from trading more aggressively at a price that appears to be unstable, and thus imminently stale, between the order's resting price and the Midpoint Price, if at or below the consolidated last sale price and the order's limit price (if any).

Consistent with one aspect of the "time of purchases" condition of Rule 10b-18, C-Peg orders may not be executable until at least one consolidated last sale trade in the security has occurred on the current day. However, the broker-dealer handling issuer repurchase orders with a C-Peg order would typically be responsible for managing compliance with the other aspect of the "time of purchases" condition with respect to effecting transactions ten or 30 minutes prior to the schedule close of trading or following the close of trading.

Otherwise, C-Peg orders would operate in the same manner as DPOs as described above.

Retail Liquidity Provider (RLP) Orders

According to some embodiments of the present invention, in order to provide retail investors with access to a trading system's pool of midpoint liquidity and to provide enhanced opportunities for meaningful price improvement at the Midpoint Price, a trading system may create a new class of market participants, Retail Member Organizations (RMOs), which would be eligible to submit certain retail order flow or "Retail orders" to the system;

According to a particular embodiment, a "Retail order" may be an agency or riskless principal order that satisfies the criteria of FINRA Rule 5320.03, which is submitted by a Retail Member Organization, designated with a "Retail order" modifier, and reflects trading interest of a natural person, with no change made to the terms of the underlying order of the natural person with respect to price (except in the case of a market order that is changed to a marketable limit order) or side of market, and that does not originate from a trading algorithm or any other computerized methodology. Retail orders may either be Discretionary Peg or Midpoint Peg orders with a Time-in-Force of IOC or FOK, and may only be eligible to trade at the Midpoint Price.

According to a preferred embodiment, the trading system may create a new type of Discretionary Peg order, known as an "RLP order," that is only eligible to execute against Retail orders.

RLP orders in the same security may be ranked and allocated according to price then time of entry into the trading system. Retail orders would seek to execute upon entry into the trading system at the Midpoint Price. RLP orders may interact with Retail orders as follows: A Retail order will seek to execute upon entry into the trading system at the Midpoint Price against orders resting on the Order Book based on price/time priority subject to the following: A Retail order to buy (sell) may execute upon entry against sell (buy) orders resting on the Order Book in the following order: (1) displayed sell (buy) orders at the NBO (NBB) during a locked or crossed market; (2) non-displayed orders priced to trade at the Midpoint Price; followed by (3) RLP orders priced to trade at the Midpoint Price.

Assuming the following facts when it is not a period of quote instability: (1) NBBO for security ABC is $10.00-$10.10; (2) User 1 enters a RLP order to buy ABC at $10.05 for 500 shares; (3) User 2 then enters an unpriced Discretionary Peg order to buy 500 shares; (4) User 3 then enters a Midpoint Peg order to buy 500 shares of ABC at $10.04. The following examples further illustrate how RLP orders may be handled in an electronic trading systems.

Example 1

RMO enters a Retail order to sell 800 shares of ABC. The order will first execute against the full size of User 2's buy order, and then execute against 300 shares of User 1's buy order, at which point the entire size of the Retail order to sell 800 shares is depleted. In this example the Retail order does not execute against User 3's buy order because the order is not priced to execute at 10.05, the current Midpoint Price.

Example 2

Assume the same facts above, except that User 2's unpriced Discretionary Peg order to buy ABC is for 100 shares. The incoming Retail order to sell 800 shares executes first against User 2's buy order for 100 shares at $10.05, then against User 1's buy order for 500 shares at $10.05. The Retail order still does not execute against User 3's buy order because the order is not priced to execute at 10.05, the current Midpoint Price. The Retail order is filled for 600 shares and the balance of 200 shares is cancelled back to the RMO.

Example 3

Assume the same facts as Example 1, except that User 3 enters a non-displayed limit order to buy 300 shares of ABC at 10.05. The incoming Retail order to sell 800 shares executes first against User 3's order for 300 shares (because it has priority over User 2's Discretionary Peg order) and then against User 2 for the remaining 500 shares, completing the Retail order's 800 share quantity. User 1's buy order is not executed because it is ranked behind Users 2 and 3.

D-Limit Orders

Orders providing liquidity are subject to potential adverse selection (i.e., being "picked off") by sophisticated liquidity takers when the market is in transition. Those market participants or traders with the fastest technology can leverage informational and technology advantages to trade against liquidity providers. For example, sophisticated liquidity takers can use advanced technology to identify when the price of a security is transitioning to a new price level and target a subset of resting orders at stale prices. However, liquidity makers often cannot move their quotes or cancel resting orders in time to avoid being picked off because of inherent limitations (e.g., throttling, processing time, etc.) in accessing exchange systems quickly enough. The challenge is particularly acute when attempting to cancel resting orders across multiple symbols. The adverse selection risk can operate to disincentivize liquidity provision, which ultimately reduces price discovery in the markets.

According to some embodiments of the present invention, a new non-pegged lit or dark order type, known as a "D-Limit order," may be created in an electronic trading system. The D-Limit order may be automatically cancelled or repriced (e.g., 1 MPV away from a CQI price level) during periods when the CQI is on (or when the CQI value is at a defined price level). During these times of price uncertainty, it is believed that there is not a level playing field with respect to the prevailing price of the security in question and as a result some market participants utilize trading strategies designed to target resting orders at stale prices. It is further believed that liquidity providing limit orders should not be forced to trade during these periods of price uncertainty. The cancellation or repricing may be generated and processed within the trading system to provide makers of liquidity protection against potential adverse selection as defined by the CQI.

According to particular embodiments, the D-Limit orders can be used by all market participants, at all levels of sophistication and technological capability and will be useful to market makers and institutional investors providing liquidity alike. While substantially similar to other exchange managed risk settings that cancel or amend orders and quotes on behalf of a member within the trading system under pre-determined (non-public) circumstances, the D-Limit order type may be more transparent and deterministic since cancellations and reprices are based on a publicly disclosed formula.

Properly implemented, the D-Limit orders may encourage more resting liquidity by allowing market participants to better manage risk and reduce risk of adverse selection as described above.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. An apparatus for facilitating dynamic peg orders in an electronic trading system, the apparatus comprising:
    a first communication interface configured to receive a trading order concerning an item of interest;
    a second communication interface configured to receive price data of said item of interest from at least one other electronic trading system;
    a matching engine, operatively coupled to the first and second communication interfaces, configured to vary price discretion of said trading order based on the received price data, wherein:
        the matching engine prevents execution of said trading order or restricts the execution to a first pricing range when the received price data indicate an instability in quotes for said item of interest or that said first pricing range does not satisfy a predetermined pricing condition, and
        the matching engine permits execution of said trading order in a second pricing range when the received price data indicate a stability in quotes for said item of interest and that said second pricing range satisfies said predetermined pricing condition,
    an order delay component, operatively coupled to at least the first communication interface and/or said matching engine, configured to impose an additional latency on an arrival or processing of data signals containing incoming trading orders at the matching engine, such that said trading order concerning said item of interest is not processed by the matching engine before the matching engine has had sufficient time to receive and process an update of said price data of said item of interest, issued prior to issuance of said trading order, from said at least one other electronic trading system.

2. The apparatus of claim 1, being further configured to:
    prevent execution of said trading order within a specified period immediately before end of a trading day.

3. The apparatus of claim 1, being further configured to:
    prevent execution of said trading order until there has been a first trade of said item of interest during a current trading day.

4. The apparatus of claim 1, being further configured to:
    calculate a crumbling quote indicator (CQI) value based on a predetermined algorithm and the received price data.

5. The apparatus of claim 1, being further configured to:
    issue a trigger signal to indicate to the matching engine said instability or said stability in the quotes for said item of interest.

6. The apparatus of claim 1, being further configured to price said trading order automatically, upon entry of said trading order in said electronic trading system, at the less aggressive of: (a) a midpoint price, (b) a last execution price, or (c) a limit price, if any, of said trading order.

7. The apparatus of claim 1, being further configured to book unexecuted shares of said trading order at the less aggressive of one minimum price variant than a national best bid (NBB) price, a last execution price, or a limit price, if any, of said trading order.

8. The apparatus of claim 1, wherein said trading order is for repurchasing said item of interest.

9. The apparatus of claim 1, wherein said additional latency is imposed on the transmission of said data signals by routing said data signals through a physical medium of chosen physical parameters.

10. An apparatus for facilitating dynamic peg orders in an electronic trading system, the apparatus comprising:
 a first communication interface configured to receive a first trading order concerning an item of interest;
 a second communication interface configured to receive price data of said item of interest from at least one other electronic trading system;
 a matching engine, operatively coupled to the first and second communication interfaces, configured to vary price discretion of said first trading order based on the received price data, wherein:
  the matching engine prevents execution of said first trading order or restricts the execution to a first pricing range and against an incoming second trading order when the received price data indicate an instability in quotes for said item of interest or when an originator of said second trading order is not a particular type of participant, and
  the matching engine permits execution of said first trading order in a second pricing range and against said incoming second trading order when the received price data indicate a stability in quotes for said item of interest and when said originator of said second trading order is said particular type of participant,
 an order delay component, operatively coupled to at least the first communication interface and/or said matching engine, configured to impose an additional latency on an arrival or processing of data signals containing incoming trading orders at the matching engine, such that said first trading order concerning said item of interest is not processed by the matching engine before the matching engine has had sufficient time to receive and process an update of said price data of said item of interest, issued prior to issuance of said first trading order, from said at least one other electronic trading system.

11. The apparatus of claim 10, being further configured to: identify said originator of said second trading order.

12. The apparatus of claim 10, wherein said particular type of participant comprises one or more retail investors.

13. The apparatus of claim 12, wherein said second trading order is limited to execution at a midpoint price only.

14. The apparatus of claim 10, being further configured to:
 issue a trigger signal to indicate to the matching engine said instability or said stability in the quotes for said item of interest.

15. The apparatus of claim 10, wherein said additional latency is imposed on the transmission of said data signals by routing said data signals through a physical medium of chosen physical parameters.

16. An apparatus for facilitating dynamic peg orders in an electronic trading system, the apparatus comprising:
 a first communication interface configured to receive a trading order concerning an item of interest;
 a second communication interface configured to receive price data of said item of interest from at least one other electronic trading system;
 a matching engine, operatively coupled to the first and second communication interfaces, configured to vary price discretion of said trading order based on the received price data, wherein:
  the matching engine automatically cancels or revises said trading order or restricts execution of said trading order to a first pricing range when the received price data indicate an instability in quotes for said item of interest, and
  the matching engine permits execution of said trading order in a second pricing range when the received price data indicate a stability in quotes for said item of interest,
 an order delay component, operatively coupled to at least the first communication interface and/or said matching engine, configured to impose an additional latency on an arrival or processing of data signals containing incoming trading orders at the matching engine, such that said trading order concerning said item of interest is not processed by the matching engine before the matching engine has had sufficient time to receive and process an update of said price data of said item of interest, issued prior to issuance of said trading order, from said at least one other electronic trading system.

17. The apparatus of claim 16, being further configured to: calculate a crumbling quote indicator (CQI) value based on a predetermined algorithm and the received price data.

18. The apparatus of claim 17, wherein the cancellation of said trading order is based on said calculated CQI value.

19. The apparatus of claim 16, being further configured to:
 issue a trigger signal to indicate to the matching engine said instability or said stability in the quotes for said item of interest.

20. The apparatus of claim 16, wherein said additional latency is imposed on the transmission of said data signals by routing said data signals through a physical medium of chosen physical parameters.

* * * * *